United States Patent [19]

Skorupa

[11] Patent Number: 5,155,070
[45] Date of Patent: Oct. 13, 1992

[54] REFRACTORY COATING COMPOSITION

[76] Inventor: Jerry S. Skorupa, P.O. Box 1525, Highland, Ind. 46322

[21] Appl. No.: 875,058

[22] Filed: Apr. 28, 1992

Related U.S. Application Data

[63] Continuation-in-part of Ser. No. 745,608, Aug. 15, 1991, abandoned.

[51] Int. Cl.5 .................. C04B 35/48; C04B 35/49; C04B 35/02; B05D 1/02
[52] U.S. Cl. ............................... 501/103; 501/94; 501/95; 501/102; 501/105; 501/153; 427/427; 428/364; 264/30
[58] Field of Search .............. 501/94, 95, 102, 103, 501/105, 133, 153, 154; 106/38.22, 38.27, 38.9, 711; 428/364, 392; 427/427, 236; 264/30

[56] References Cited

U.S. PATENT DOCUMENTS

| | | | |
|---|---|---|---|
| 4,822,679 | 4/1989 | Cerdan-Diaz et al. | 428/392 |
| 4,857,489 | 8/1989 | Bearder | 501/95 |
| 4,868,142 | 9/1989 | Waisala et al. | 501/85 |
| 4,951,852 | 8/1990 | Rancoulle | 222/591 |
| 5,039,634 | 8/1991 | Dulberg et al. | 501/95 |

Primary Examiner—Mark L. Bell
Assistant Examiner—Michael A. Marcheschi
Attorney, Agent, or Firm—Cook, Egan, McFarron & Manzo, Ltd.

[57] ABSTRACT

A refractory coating composition, adapted to be applied to a substrate by spraying or gunning, comprising: from about 25 to about 40% by weight alumina; from about 15 to about 25% by weight ceramic fiber; from about 40 to about 60% by weight colloidal silica; and sufficient water to form an aqueous suspension thereof.

11 Claims, No Drawings

REFRACTORY COATING COMPOSITION

This is a continuation-in-part of copending application Ser. No. 07/745,608, filed on Aug. 15, 1991, now abandoned.

The present invention is directed to a refractory coating composition, more particularly to a refractory coating composition which has improved thermal insulation properties and to a process for installing the refractory coating by gunning or spraying. More particularly, the present invention is directed to a fiber-containing refractory composition which may be readily installed by gunning or spraying or troweling to provide a durable coating having improved thermal insulation properties.

BACKGROUND

A wide variety of refractory coating compositions are known in the prior art, although there have been problems associated therewith. For example, a composition known as Never (FA9) has been available for some years from LOCH Corporation. It has the following approximate composition:

| material | weight | percentage of solids |
|---|---|---|
| A-12 alumina | 30 lbs | 53.6 |
| chopped ceramic fiber | 4 lbs | 7.1 |
| colloidal silica | 22 lbs | 39.3 |
| water | 8 lbs | |
| | 56 lbs solids | 100% |

The FA9 was difficult to handle because it tends to fall out of suspension, and thereafter it is most difficult to resuspend. The unstable FA9 suspension tends to produce an uneven application of the coating composition which results in a coating having inferior thermal insulation properties.

BRIEF DESCRIPTION OF THE PRESENT INVENTION

The present invention is directed to an improved refractory coating composition which provides superior handling properties in that the coating composition is in the form of a stable suspension. The preferred embodiment of the coating composition of the present invention is not only a stable suspension, but provides superior thermal insulating qualities upon installation.

In the broadest embodiment, the coating composition of the present invention comprises from about 25 to 59% by weight of a refractory mineral such as zirconia, calcined alumina or mixtures thereof, from about 12 to 28% by weight of ceramic fiber, and from about 30 to 60% by weight of a binder such as a 40% colloidal silica suspension. Sufficient water, e.g. 7 to 18% by weight, based on the weight of the other components, must be added to form a suspension of the composition having the desired consistency.

The refractory coating compositions of the present invention may be applied to various solid substrates by spraying or gunning. The substrates may be a refractory material (any prefired, predried heat retentive refractory) or may be a metallic material such as steel. In order to get the best bonding of the coating to the substrate it is necessary to apply the refractory coating composition to the substrate when the substrate is at an elevated temperature. It has been found that heating the surface of substrates to temperatures of at least 150° F. prior to application of the coating produces a good bond between the refractory coating composition and the substrate, and the coating composition sets up rapidly and adheres well to the substrate. Application of the coating to a heated substrate allows the coating to be applied in multiple layers quickly, in order to build up the thickness of the coating to the desired thickness.

DETAILED DESCRIPTION OF THE PRESENT INVENTION

The preferred refractory coating composition of the present invention generally comprises from about 25 to about 40% by weight of a refractory mineral, from about 15 to about 28% of a ceramic fiber, and from about 40 to about 60% by weight of a 40% colloidal silica suspension, along with sufficient water, e.g. 7 to 18% based on the weight of the other components, to form an aqueous suspension of the solid components.

THE REFRACTORY MINERAL

The amount of refractory mineral used in the refractory coating composition depends largely on whether the refractory mineral includes zirconia. For compositions having the best thermal insulating properties, the use of 35–40% by weight of zirconia is preferred. For those compositions which contain no zirconia, good results have been achieved with the use of about 30–35% by weight of calcined alumina. The improved thermal insulation achieved with the zirconia is balanced against the more expansive cost of the zirconia.

Increasing the amount of the refractory mineral above about 40% by weight tends to diminish the insulating value of the coating composition. Decreasing the amount of refractory mineral in the coating composition to less than about 25% by weight reduces the body or firmness of the coating composition.

It is preferred to use a calcined alumina which passes a 325 mesh screen. In particular, an alumina available under the trade name AC12-325 from AluChem, Inc. is preferred, but other types of alumina could be used. A 325 mesh calcined alumina is available from ALCOA Inc., under the designation AC12-325. Other distributors of an acceptable, calcined alumina include LaRoche Chemical, Inc., under their number C5R325. and Solom Chemical.

Although zirconia is not required, improved thermal insulation properties are achieved by using zirconia to replace some or all of the alumina. In the preferred embodiment, the composition includes a large amount of zirconia ($ZrO_2$) having a 325 mesh size. The addition of up to 5% by weight of zirconia to the composition provides enhanced thermal insulation values. It has been found that the addition of 2 to about 3% by weight, on a dry basis, of zirconia to the base coating composition provides enhanced thermal insulation properties. The use of more than 5% by weight of zirconia provides yet further enhancement of the thermal insulating qualities of the coating composition. Substituting zirconia for all of calcined alumina provides a product with thermal insulating qualities superior to a product using only calcined alumina. Decreasing the amount of the zirconia used would reduce the insulating value of the coating composition.

Acceptable refractory minerals include milled zirconia, a dry processed fully calcined zirconia, milled to controlled particle distribution. A product that is acceptable is Remet Milled Zircon from Remet Corporation identified as product number PD-4. Those knowledgeable in the art are aware that similar products that have refractoriness are acceptable as long as the character of the product is maintained. The above-described mineral is about 25 to 59% of the composition.

Alternatively, Bauxite, a mineral composed chiefly of alumina, may be ground, and calcined for use in the coating composition of the present invention. Also calcined Mulite, the lower end of the alumina family, maybe used in place of calcined alumina. It cannot be used to replace the zirconia as the thermal insulating properties are too low. It has been found that the 325 mesh size is preferred because it does not conduct heat as well as a more coarse size, such as 200 mesh size. The less the mineral conducts heat the better it insulates. The smaller sizes such as 325 mesh are easier to mix and pump through the nozzle tip. Melting point is not affected by size.

The Ceramic Fiber

Good results have been achieved using 12-28% by weight of ceramic fiber. It is preferred to use at least 15% by weight of ceramic fiber, although lesser amounts may be used. A wide variety of ceramic fiber types may be used. The preferred ceramic fiber is a Ceramic Fiber HP (high purity), hammer-milled to about ⅛" long, available from A.P. Green Industries, Inc. under the designation HM-1. Also available for use is a material produced by A.P. Green Industries under the name Fiber Mix 901 having the chemical analysis of 46 to 48% $Al_2O_3$, 23 to 25% $SiO_2$ and 27 to 29% $ZrO_2$ and less than 0.5% of other ingredients. Fiber mix 901 has a higher melting point and has two and a half times greater insulating values, K-Factor, than HM-1. A grade of a ceramic fiber that has been hammer-milled is about 12 to 28% of the composition. Other grades of ceramic fiber which has been chopped and/or hammer-milled to about ⅛ inch may be used including alumina-silica, alumina-silica-zirconia polycrystalline mulite fibers, calcium aluminum silicate, silicon carbide, alumino-silicate, alumina, mineral fibers and the like or any grade of ceramic fiber that is considered to be crystalline silica free. Hammer-milled #1 is a 2400° alumina-silica ceramic fiber and has a melting point of 2500° F. constant use. The ceramic fiber strands, approximately 8" in length and 3.25 to 3.55 microns (diameter), standard in the industry, are used to make a blanket of fiber or it is sold in a bulk form. Basically, Hammer-milled #1 are the cut off pieces that are too short for the blanket or the bulk. Other types of chopped ceramic fiber, which is supplied in bulk by many other ceramic fiber manufacturers, may also be used.

The Binder

Generally speaking, approximately half of the refractory coating composition are made up of a colloidal silica suspension which functions as a binder and thickener. The colloidal silica binders used in the Examples, which follow, all contain about 40% by weight of silica. Useful results have been achieved using compositions containing from 40 to about 60% of binders comprising about 40% by weight of colloidal silica. The amount of colloidal silica used in the coating composition may vary over wide limits. The size of the colloidal silica used in the compositions of the present invention may vary over wide limits. The binder of colloidal silica has a particle size 13-15 millimicrons, a surface area of about 230 m²/gram and 40% solids. The preferred colloidal silica binder is a suspension available from Remet Chemical Corporation under the name Remasol LP 40 (containing 40% silica).

Other colloidal silica suspensions capable of performing as a thickener and binder are: Nalco Chemical 1140 Colloidal S. Sra; and Ludox HS40 and HS60 from E.I. DuPont de Nemours & Co.

Zirconia Sol from Remet Corporation, PD-39, may also be used as a high temperature binder. This material produces a $ZrO_2$ bond in refractory and refractory type applications. The use of this type of zirconia has been used very successfully in our product. It will be understood by those skilled in the art that various grades of colloidal silica, having from 30% solids to 60% solids, may be used to achieve the desired binder and/or thermal results. The binder and thickener Zirconia Sol, and the like or colloidal silica generally make up about 40 to 60% of the composition.

Other Materials

The coating compositions of the present invention may include up to 5% by dry weight of other materials such as bentonite clay, or a liquid polymer to act as a lubricant to aid in the use of the total composition. This addition makes the material slipperier and thus easier to pump.

Water

The amount of water used will depend upon the application method desired. Generally speaking, sufficient water should be added at the time to manufacture to form a suspension, with additional water being added at the job site to achieve the proper consistency. If too much water is added, the refractory mineral may fall out of suspension which is difficult to resuspend. Freezing of the coating compositions must be avoided, but the compositions are otherwise stable at ambient temperatures. When the coating is to be installed by spraying or gunning, the addition of 7-16% by weight of water, based on the weight of the other ingredients provides satisfactory performance.

The present invention contemplates the installation of the composition by gunning or spraying, troweling or casting (the material is poured into a form and then dried). Those skilled in the art will understand that a higher level of water should be used in compositions which are to be installed by spraying or gunning.

Installation

The coating composition of the present invention is preferably applied to preheated substrates by spraying or gunning using conventional equipment. Generally, it is desired to have the surface of the substrate preheated to an elevated temperature before the coating composition is sprayed on the substrate. It is most preferred to preheat the substrate temperature to at least the minimum of 150° prior to the application process. Successful runs have been made applying the coating composition of the present invention to steel substrates heated to temperatures to 200° F. or more, so that the temperature of substrate remains at 150° F. or more throughout the application process. Preheating the substrate causes the coating composition to rapidly set and provides improved adhesion to the substrate. This allows the application of the coating composition in a series of relatively thin layers, each of which is rapidly set up, in order to produce a coating having the desired total thickness. Best results are attained if the substrate remains above 150V6,36 F throughout the application of all layers.

The equipment used to gun or spray the coating composition is commercially available, conventional equipment. Spraying can be accomplished using a modified Grayco 10 to 1 Suction Pump with an air regulator. It is preferred to use a standard size ¾" high pressure hose, not to exceed 35 feet in length, with an air aspirated nozzle of a preferred length of 30 inches. It is also preferred to use a nozzle tip of at least ⅜", but not exceeding ⅝ inches. A hose over 35 feet exhibits a clogging tendency with the coating composition of the present invention and a nozzle larger than ⅝" gives an uncontrolled spray pattern, smaller than ⅜" creates clogging at the nozzle. Preferably, a mixer is used to keep the coating composition in suspension. Air pressure of approximately 65 psi on the Grayco pump has produced useful results.

The coating composition of the present invention may be applied to existing structures, including walls or other structures fabricated from refractories including both hard refractories and fiber linings or from metals such as steel. It is preferred to apply the coating composition of the present invention to new, unpainted steel structures in order to achieve the best adhesion and thermal insulation. It is preferred to apply the coating composition of the present invention to ceramic fiber substrates after they have been heated and have undergone shrinkage. The coating composition of the present invention may also be applied to slag and to structures partially covered with slag. Alternatively, the coating composition of the present invention may be applied to preheated panels of either refractory or steel, which are later installed in furnaces or the like with the coating already in place. Further, the coating composition of the present invention has been used successfully in a repair function to repair equipment wherein the coating or refractory surface materials have become displaced.

The following examples serve to illustrate the preparation and use of several coating compositions within the scope of the present invention. These examples present data within the scope of the present invention, but it is understood that these examples are set forth merely for illustrative purposes and many other coating compositions are within the scope of the present invention:

EXAMPLE 1

The composition shown below was prepared by dry mixing the solid components in a commercial mixer. Water was then gradually added to the mixture, while running the mixer, to achieve a suspension having the desired consistency. The formulation was as follows:

| material | weight | percentage of solids |
| --- | --- | --- |
| A-12 alumina | 15 lbs | 33.3 |
| chopped ceramic fiber (Hammer-milled #1) | 8 lbs | 17.8 |
| colloidal silica | 22 lbs | 48.9 |
| water | 6 lbs | |
| | 45 lbs of solids | 100% |

The coating composition of Example 1 was applied to the preheated refractory roof of a reheat furnace by spraying the coating with a modified Grayco pump, operated at a 10 to 1 ratio. The coating composition was installed with no problems with respect to falling out of suspension and a uniform durable coating was produced across the entire top of the furnace. The cold face temperatures of the reheat furnace roof were lowered by approximately 80° F. as a result of the application of coating composition of Example 1.

EXAMPLE 2

The composition shown below was prepared by first dry-mixing all of the dry ingredients followed by the addition of water in a quantity sufficient to provide an aqueous suspension having the desired consistency. This composition was:

| material | weight | percentage of solids |
| --- | --- | --- |
| A-12 alumina | 13 lbs | 29.9 |
| zirconia | 1 lb | 2.3 |
| chopped ceramic fiber (Hammer-milled #1) | 8 lbs | 18.2 |
| colloidal silica (HS-40) | 22 lbs | 50.0 |
| water | 6 lbs | |
| | 44 lbs of solids | 100% |

The material of Example 2 was gunned onto an electric furnace roof made up of water cooled steel panels, which were preheated prior to coating. The installation was facile and produced a durable uniform coating composition over the entire surface. Again, improved insulation properties have been reported. One steel producer estimates a savings of $700 to $900 per heat of steel, 400 tons (800,000 pounds).

EXAMPLE 3

The composition shown below, similar to the composition of Example 1, was prepared by dry mixing the solid components in a commercial mixer. Water was then gradually added to the mixture, while running the mixer, to achieve a suspension having the desired consistency. The formulation was as follows:

| material | weight | percentage of solids |
| --- | --- | --- |
| AC12-325 alumina | 15 lbs | 32.7 |
| chopped ceramic fiber (Hammer-milled #1) | 8 lbs | 17.4 |
| colloidal silica (HS-40) | 22 lbs | 47.9 |
| water | 6 lbs | 2.2 |
| Bentonite Clay | 1 lb | |
| | 46 lbs of solids | 100% |

EXAMPLE 4

The composition shown below, similar to the composition of Example 2, was prepared by first dry-mixing all of the dry ingredients followed by the addition of water in a quantity sufficient to provide an aqueous suspension having the desired consistency. This composition was:

| material | weight | percentage of solids |
| --- | --- | --- |
| AC12-325 alumina | 13 lbs | 28.9 |
| zirconia | 1 lb | 2.3 |
| chopped ceramic fiber (Hammer-milled #1) | 8 lbs | 17.8 |
| colloidal silica (HS-40) | 22 lbs | 48.9 |
| water | 6 lbs | |
| Bentonite Clay | 1 lb | 2.3 |
| | 45 lbs of solids | 100% |

EXAMPLE 5

The composition shown below was prepared by dry mixing the solid components in a commercial mixer. Water was then gradually added to the mixture, while running the mixer, to achieve a suspension having the desired consistency. The formulation was as follows:

| Material | Weight | Percentage of solids |
| --- | --- | --- |
| Zirconia | 18 lbs | 36.0 |
| 901 Alumina Silica Zirconia Ceramic Fiber | 8 lbs | 16.0 |
| Colloidal Silica (HS-40) | 23 lbs | 46.0 |
| Water | 5 lbs | |
| Bentonite Clay | 1 lb | 2.0 |
| | 50 lbs of solids | 100% |

The composition of Example 5 was sprayed (gunned) at a 80" Hot Strip Mill on #6 Reheat Furnace of Inland Steel Company, East Chicago, Ind. using the equipment described in Example 1. The composition was applied to the primary heating zone sidewall. The temperature of the sidewall at the time application was at least 175° F. This installation produced a durable, insulating coating composition over the entire 450 sq. foot area. The cold face temperatures before application of the coating were 450° to 700°. After the application of the coating, the cold face temperatures ranged from 300° to 500°, a reduction of approximately 200° F.

EXAMPLE 6

The composition shown below, similar to Example 1, was prepared by dry mixing the solid components in a commercial mixer. Water was then gradually added to the mixture, while running the mixer, to achieve a suspension having the desired consistency. The formulation was as follows:

| material | weight | percentage of solids |
| --- | --- | --- |
| Zirconia | 8 lbs | 36.8 |
| Chopped Ceramic Fiber, HM-1 | 8 lbs | 16.4 |
| Zirconia Sol PD-39 | 22 lbs | 44.9 |
| Water | 6 lbs | |
| Bentonite Clay | 1 lb | 2.1 |
| | 49 lbs | 100.2 |

The compositions of Examples 3, 4, 5, and 6 may be used in the manner of Examples 1 and 2.

While the present invention has been described in the context of a refractory coating composition installed by spray application to portions of furnaces and the like, it will be understood that the present invention may be applied to other areas wherein refractory insulation is required or desired. Those skilled in the art will also be aware that the forms herein shown and described are to be considered only as illustrative. It will be apparent to those skilled in the art that numerous modifications may be made therein without departure from the spirit of the invention or the scope of the appended claims.

I claim:

1. A refractory coating composition, adapted to be applied to a substrate by spraying or gunning, consisting essentially of:
    from about 25 to about 40% by weight of a refractory mineral selected from the group consisting of zirconia, calcined alumina, and mixtures thereof;
    from about 15 to about 25% by weight ceramic fiber;
    from about 40 to about 60% by weight of a colloidal silica dispersion binder; and
    sufficient water to form an aqueous suspension thereof.

2. The refractory coating composition as described in claim 1 wherein said refractory mineral consists essentially of zirconia.

3. The refractory coating composition as described in claims 1 or 2 wherein said ceramic fiber is a hammer-milled fiber.

4. A refractory coating composition consisting essentially of:
    about 33.3% by weight calcined alumina;
    about 17.8% by weight ceramic fiber;
    about 48.9% by weight a colloidal silica dispersion; plus
    sufficient water to form an aqueous suspension thereof.

5. A refractory coating composition consisting essentially of:
    about 30% by weight of a calcined alumina;
    about 2.5% by weight of zirconia;
    about 18% by weight of ceramic fiber; and
    about 50% by weight of a colloidal silica dispersion; and
    sufficient water to form an aqueous suspension thereof.

6. A refractory coating composition consisting essentially of:
    about 37% by weight of zirconia;
    about 16% by weight of a ceramic fiber;
    about 47% by weight of a colloidal silica dispersion; and
    sufficient water to form an aqueous suspension thereof.

7. The refractory coating composition as described in claims 4, 5 or 6 wherein the fiber is a hammer-milled ceramic fiber.

8. A method of insulating a substrate which comprises preheating the substrate to a temperature of at least 150° F. and spraying the refractory coating composition of claims 1, 2, or 3 on said heated substrate.

9. A method of insulating a refractory substrate which comprises preheating the substrate to a temperature of at least 150° F. and applying thereto, by spraying or gunning, the refractory coating composition described in claims 1, 2, or 3.

10. A method of insulating a steel substrate which comprises preheating the steel substrate to a temperature of at least 200° F. and applying thereto, by spraying or gunning, the refractory coating composition described in claims 1, 2 or 3.

11. A method of insulating a steel panel which comprises preheating the steel panel to a temperature of at least 200° F. and applying thereto by spraying or gunning the refractory coating composition described in claims 1, 2, or 3.

* * * * *